(12) United States Patent
Ma et al.

(10) Patent No.: US 11,237,308 B2
(45) Date of Patent: Feb. 1, 2022

(54) DISPLAY APPARATUS

(71) Applicant: BOE Technology Group Co., Ltd., Beijing (CN)

(72) Inventors: Xinli Ma, Beijing (CN); Xiaochuan Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 179 days.

(21) Appl. No.: 16/334,631

(22) PCT Filed: Apr. 27, 2018

(86) PCT No.: PCT/CN2018/084786
§ 371 (c)(1),
(2) Date: Mar. 19, 2019

(87) PCT Pub. No.: WO2019/019739
PCT Pub. Date: Jan. 31, 2019

(65) Prior Publication Data
US 2020/0158925 A1 May 21, 2020

(30) Foreign Application Priority Data
Jul. 26, 2017 (CN) .................. 201720919771.X (51) Int. Cl.
*G02B 5/04* (2006.01)
*G02B 3/00* (2006.01)
*G02B 3/06* (2006.01)

(52) U.S. Cl.
CPC ............. *G02B 5/04* (2013.01); *G02B 3/0056* (2013.01); *G02B 3/06* (2013.01)

(58) Field of Classification Search
None
See application file for complete search history.

(56) References Cited

U.S. PATENT DOCUMENTS 5,903,682 A * 5/1999 Chun ..................... H04N 19/54
382/276
2010/0182219 A1 7/2010 Tomisawa et al.
(Continued)

FOREIGN PATENT DOCUMENTS

CN 104685404 A 6/2015
CN 105390528 A 3/2016
(Continued)

OTHER PUBLICATIONS

International Search Report for International Application No. PCT/CN2018/084786 dated Jul. 25, 2018, 3 pages.
(Continued)

*Primary Examiner* — Christopher Stanford
*Assistant Examiner* — Journey F Sumlar
(74) *Attorney, Agent, or Firm* — Judson K. Champlin; Westman, Champlin & Koehler, P.A.

(57) ABSTRACT

The embodiments of the present disclosure disclose a display apparatus. The display apparatus includes: a display unit having a plurality of pixel units; a lens unit; and a light path adjustment unit disposed between the display unit and the lens unit and configured to adjust a light path of light emitted from at least one of the plurality of pixel units, such that the adjusted light path has a predetermined range of incident angles with respect to the lens unit.

12 Claims, 7 Drawing Sheets

(56) References Cited

U.S. PATENT DOCUMENTS

| | | | | |
|---|---|---|---|---|
| 2011/0090419 | A1* | 4/2011 | Yokoyama | G02B 30/27 349/57 |
| 2013/0052430 | A1* | 2/2013 | Spiro | G06T 13/80 428/195.1 |
| 2015/0036209 | A1* | 2/2015 | Ichihashi | G02B 30/25 359/315 |
| 2015/0236302 | A1 | 8/2015 | Gyoung et al. | |
| 2016/0018645 | A1* | 1/2016 | Haddick | G06T 19/20 345/8 |

FOREIGN PATENT DOCUMENTS

| | | |
|---|---|---|
| CN | 206115049 U | 4/2017 |
| CN | 206906707 U | 1/2018 |
| WO | 2008126283 A1 | 10/2008 |

OTHER PUBLICATIONS

Written Opinion of the International Searching Authority, including English translation of Box V of the Written Opinion, for International Application No. PCT/CN2018/084786 dated Jul. 25, 2018, 6 pages.

* cited by examiner

DISPLAY APPARATUS

CROSS-REFERENCE TO RELATED APPLICATION(S)

This application claims priority to the PCT Application No. PCT/CN2018/084786, filed on Apr. 27, 2018, entitled "DISPLAY APPARATUS", which claims priority to the Chinese Patent Application No. 201720919771.X, filed on Jul. 26, 2017, entitled "DISPLAY APPARATUS", which are incorporated herein by reference in their entireties.

TECHNICAL FIELD

The present disclosure relates to the field of display, and more particularly, to a display apparatus.

BACKGROUND

Virtual reality technology refers to virtualizing real scenes to generate virtual images, and then fusing the virtual images into a combined image to be presented to a viewer through a display apparatus. However, in a conventional display apparatus, a picture on a display screen is imaged as a real image or a virtual image through a lens. In order to zoom in or zoom out the picture on the display screen, it is usually required to have a long distance between the lens and the display screen; otherwise human eyes may feel dizzy or may be unable to recognize an image. As a result, the display apparatus is too thick and too heavy.

SUMMARY

According to an aspect of the present disclosure, there is proposed a display apparatus, comprising: a display unit having a plurality of pixel units; a lens unit; and a light path adjustment unit disposed between the display unit and the lens unit and configured to adjust a light path of light emitted from at least one of the plurality of pixel units, such that the adjusted light path has a predetermined range of incident angles with respect to the lens unit.

In some embodiments, the light path adjustment unit comprises: a transparent material layer disposed between the display unit and the lens unit; and a prism disposed between the transparent material layer and the lens unit and having a refractive index greater than that of the transparent material layer.

In some embodiments, the refractive index of the transparent material layer satisfies the following conditions:

$$0 \leq \arcsin\frac{n_1}{n_2} \leq 70° \text{ and } 0 \leq \arcsin\frac{n_3}{n_2} \leq 70°,$$

where $n_1$, $n_2$ and $n_3$ are the refractive index of the light emitted from the pixel unit with respect to air, the refractive index of the light emitted from the pixel unit with respect to the prism, and the refractive index of the light emitted from the pixel unit with respect to the transparent material layer respectively.

In some embodiments, the lens unit comprises a plurality of micro-lenses corresponding to the plurality of pixel units in an one-to-one manner.

In some embodiments, the display unit is divided into a plurality of display regions, wherein each of the display regions comprises at least two adjacent pixel units, and light emitted from each of the display regions forms a virtual image pixel through a corresponding one of the micro-lenses.

In some embodiments, the virtual image pixel has a desired single grayscale.

In some embodiments, two adjacent display regions comprise at least one common pixel unit.

In some embodiments, the micro-lens is a prism, a convex lens, or a cylindrical lens.

In some embodiments, the display unit is a liquid crystal display unit or an organic light emitting diode display unit.

In some embodiments, the prism is a triangular prism.

BRIEF DESCRIPTION OF THE ACCOMPANYING DRAWINGS

In order to more clearly illustrate the technical solutions in the embodiments of the present disclosure, the accompanying drawings to be used in the description of the embodiments will be briefly described below. It is obvious that the accompanying drawings in the following description are only some embodiments of the present disclosure. Other accompanying drawings may be obtained by those of ordinary skill in the art according to these accompanying drawings without any creative work. In the accompanying drawings.

DETAILED DESCRIPTION

In order to make the purposes, technical solutions and advantages of the embodiments of the present disclosure more clear, the technical solutions in the embodiments of the present disclosure will be clearly and completely described below in conjunction with the accompanying drawings in the embodiments of the present disclosure. Obviously, the embodiments described are a part of the embodiments of the present disclosure instead of all the embodiments. All other embodiments obtained by those of ordinary skill in the art based on the described embodiments of the present disclosure without contributing any creative work are within the protection scope of the present disclosure. It should be illustrated that throughout the accompanying drawings, the same elements are represented by the same or similar reference signs. In the following description, some specific embodiments are for illustrative purposes only and are not to be construed as limiting the present disclosure, but merely examples of the embodiments of the present disclosure. The conventional structure or construction will be omitted when it may cause confusion with the understanding of the present disclosure. It should be illustrated that shapes and dimensions of components in the figures do not reflect true sizes and proportions, but only illustrate contents of the embodiments of the present disclosure.

Unless otherwise defined, technical terms or scientific terms used in the embodiments of the present disclosure should be of ordinary meanings to those skilled in the art. "First", "second" and similar words used in the embodiments of the present disclosure do not represent any order, quantity or importance, but are merely used to distinguish between different constituent parts.

Figure 1A:
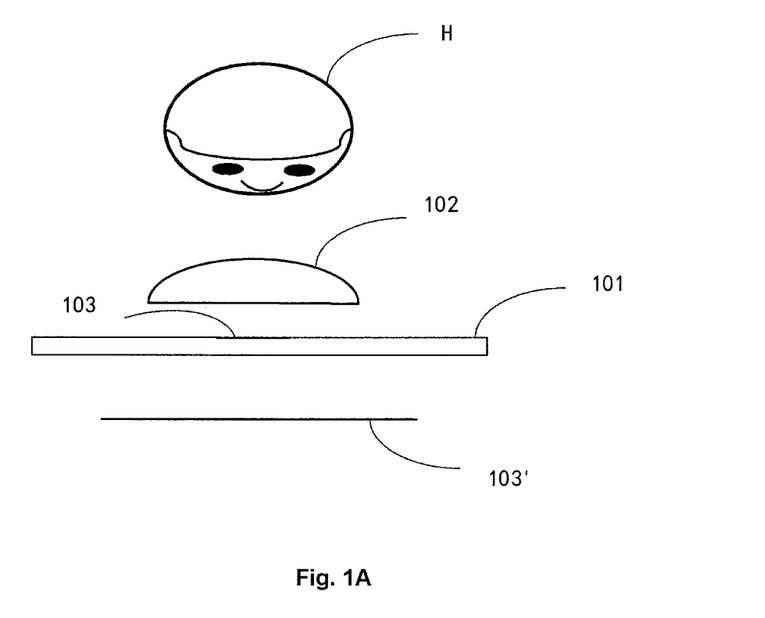
FIG. 1A illustrates a schematic structural diagram of a related display apparatus.

FIG. 1A illustrates a schematic structural diagram of a related display apparatus 100. As shown in FIG. 1A, the display apparatus 100 may comprise a display unit 101 and a lens unit 102. An image 103 is displayed on the display unit 101. According to the related technical solution, the lens unit 102 may comprise a first lens and a second lens disposed for a left eye and a right eye respectively, such that focal lengths f of the first lens and the second lens are greater than a distance from the display unit 101 to the respective lenses respectively, and thereby the lenses function as magnifying glasses. Therefore, eyes of a viewer H may see a plurality of enlarged erect virtual images 103' through the first lens and the second lens respectively, and fuse the erect virtual images 103' in his/her brain to obtain an amplified erect virtual image 103' of the image 103.

Figure 1B:
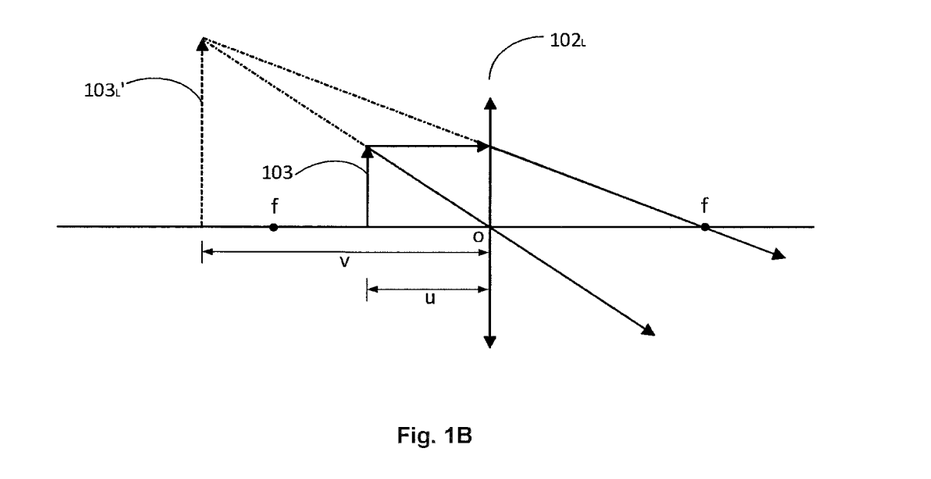
FIG. 1B illustrates a schematic diagram of a light path of the display apparatus in FIG. 1A.

FIG. 1B illustrates a schematic diagram of a light path of the display apparatus 100 in FIG. 1A. For the sake of brevity, FIG. 1B is shown by taking a first lens 102L as an example. It can be understood by those skilled in the art that a light path diagram for the second lens may be obtained similarly. In FIG. 1B, o is an optical center of the lens 102, f is a focus of the lens 102, and light which is emitted from the image 103 displayed on the display unit 101 is refracted through the lens 102L to form an amplified erect virtual image 103' on one side of the display unit 101 away from the viewer H.

However, in the above example, for the enlarged virtual image 103', a distance from the virtual image 103' to human eyes (approximate to an image distance v in a case where the human eyes are close to the lens, particularly in a case where a device such as a Virtual Reality (VR) helmet is used) is usually required to be greater than 20 cm; otherwise the viewer H may feel dizzy or may be unable to recognize the image. In order to generate such a large image distance v without distortion, a distance between the display unit 101 and the lens 102, that is, an object distance u, is required to be large. Therefore, the related display apparatus is too thick and too heavy, which may cause discomfort to users.

Embodiments of the present disclosure provide a display apparatus, which will be described in detail below with reference to the accompanying drawings.

Figure 2A:
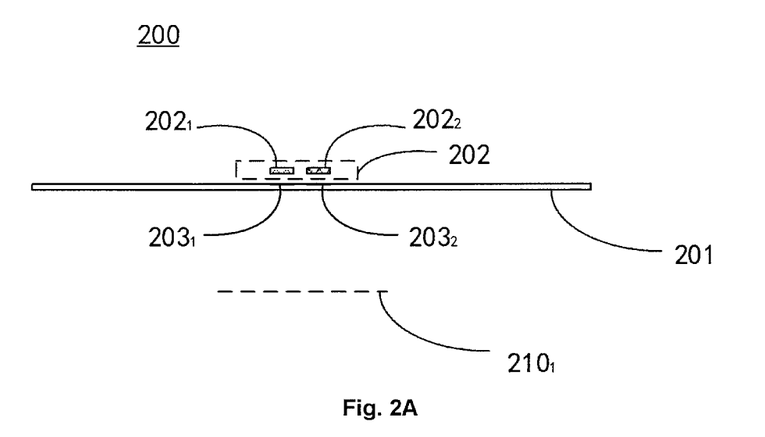
FIG. 2A illustrates a schematic cross-sectional view of a display apparatus according to an embodiment of the present disclosure.

FIG. 2A illustrates a schematic cross-sectional view of a display apparatus 200 according to an embodiment of the present disclosure. As shown in FIG. 2A, the display apparatus 200 according to the embodiment of the present disclosure may comprise a display unit 201 having a plurality of pixel units (for example, $203_1$ and $203_2$). The display apparatus 200 further comprises a lens unit 202. The lens unit 202 comprises a plurality of micro-lenses $202_1$ and $202_2$ which are in one-to-one correspondence with the plurality of pixel units. The micro-lenses $202_1$ and $202_2$ are disposed such that light emitted from at least two adjacent pixel units $203_1$ and $203_2$ among the plurality of pixel units form one virtual image pixel $210_1$ having a single desired grayscale through the respective micro-lenses $202_1$ and $202_2$.

Figure 2B:
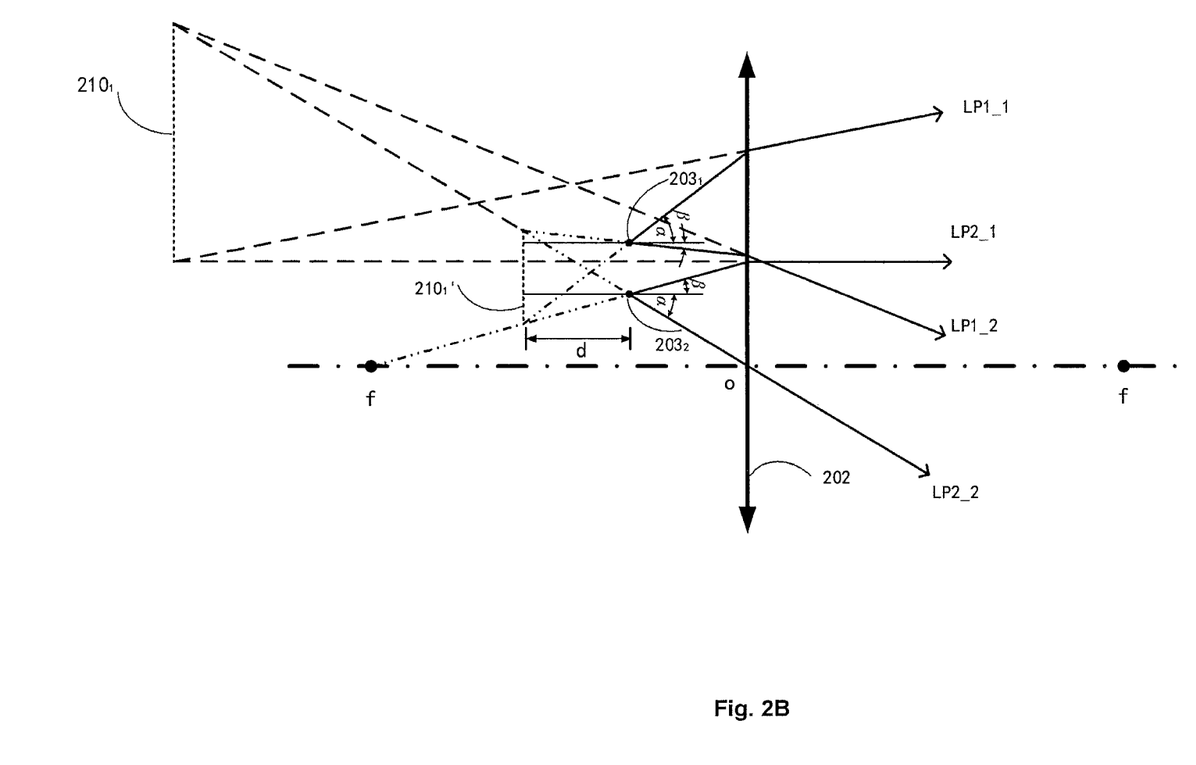
FIG. 2B illustrates a schematic diagram of a light path of the display apparatus in FIG. 2A.

FIG. 2B illustrates a schematic diagram of a light path of the display apparatus 200 according to an embodiment of the present disclosure. In FIG. 2B, o is an optical center of the equivalent lens unit 202, and f is a focus of the lens unit 202. As shown in FIG. 2B, light emitted from the pixel unit $203_1$ is refracted through the equivalent lens unit 202 and emitted as light LP1_1 and LP1_2, and light emitted from the pixel unit $203_2$ is refracted through the lens unit 202 and emitted as light LP2_1 and LP2_2. A light beam between the light LP1_1 and LP1_2 and a light beam between the light LP2_1 and LP2_2 are mixed to form one virtual image pixel $210_1$. This virtual image pixel $210_1$ may be equivalent to an image formed by light emitted from a virtual object pixel $210_1'$ on one side of the display unit 201 away from a viewer. A distance from the virtual object pixel $210_1'$ to the display unit 201 is d, and therefore an actual distance from the display unit to the viewer may be reduced, which makes the display apparatus more portable.

Figure 2C:
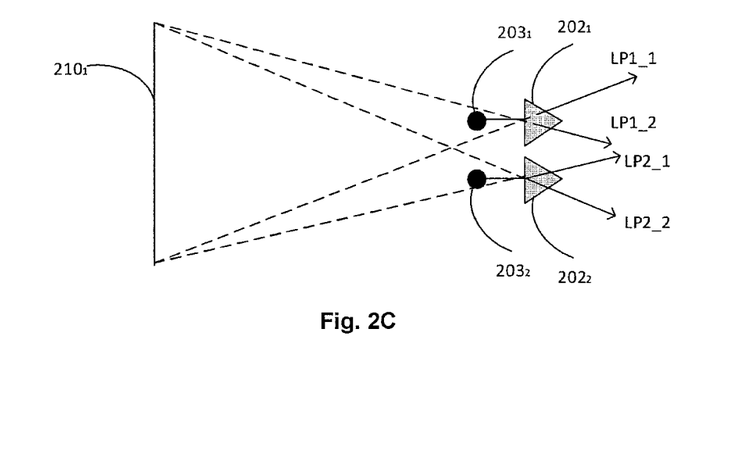
FIG. 2C illustrates an exemplary schematic diagram of a light path according to an embodiment of the present disclosure.

FIG. 2C illustrates an exemplary diagram of a light path according to an embodiment of the present disclosure. As shown in FIG. 2C, light emitted from the pixel unit $203_1$ is refracted through the micro-lens $202_1$ and emitted as light LP1_1 and LP1_2, and light emitted from the pixel unit $203_2$ is refracted through the micro-lens $202_2$ and emitted as light LP2_1 and LP2_2. The light beam between the light LP1_1 and LP1_2 and the light beam between the light LP2_1 and LP2_2 form one virtual image pixel $210_1$ having a single desired grayscale, for example, one of grayscale values of 0 to 255. The desired grayscale is obtained by mixing the light emitted from the pixel unit $203_1$ and the light emitted from the pixel unit $203_2$.

Figure 3A:
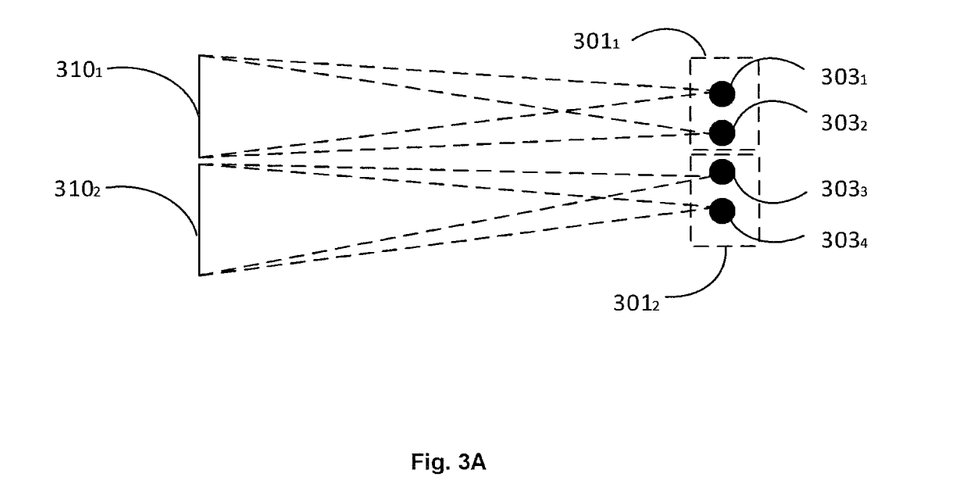
FIG. 3A illustrates a schematic diagram of a relationship between pixel units and corresponding virtual image pixels according to an embodiment of the present disclosure.

FIG. 3A illustrates a schematic diagram of a relationship between pixel units and corresponding virtual image pixels according to an embodiment of the present disclosure. As shown in FIG. 3A, a display unit 301 may be divided into a plurality of display regions $301_1$ to $301_n$, where n is an integer greater than 1. Two display regions $301_1$ and $301_2$ are shown in FIG. 3A. Each of the display regions comprises at least two adjacent pixel units, and light emitted from pixel units in each of the display regions forms one virtual image pixel having a desired single grayscale through a corresponding micro-lens. In some other embodiments, two adjacent display regions may comprise at least one common pixel unit. However, in the embodiment shown in FIG. 3A, adjacent display regions do not comprise a common pixel unit. For example, the display region $301_1$ may comprise pixel units $303_1$ and $303_2$, and the display region $301_2$ may comprise pixel units $303_3$ and $303_4$. Therefore, the display region $301_1$ and the display region $301_2$ may not comprise the same pixel unit. Of course, according to an embodiment of the present disclosure, each of the display regions $301_1$ and $301_2$ may also comprise more pixel units. In addition, the display regions $301_1$ and $301_2$ may also comprise the same pixel units.

Light emitted from at least two pixel units in each of the display regions $301_1$ and $301_2$ forms a corresponding virtual image pixel $310_1$ or $310_2$ having a desired grayscale through a corresponding micro-lens. The desired grayscale may be one of grayscale values of 0 to 255. That is, each of the virtual image pixels $310_1$ and $310_2$ is equivalent to one pixel point in a desired image, and the virtual image pixels $310_1$ and $310_2$ may be equivalent to two adjacent pixel points in the desired image. Light emitted from all the display regions $301_1$ to $301_n$ forms n virtual image pixels $310_1$ to $310_n$ through the respective micro-lenses, wherein a grayscale value of each virtual image pixel is obtained by mixing light emitted from all the pixel units in a corresponding display region of the display unit 301. Therefore, each of the virtual image pixels $310_1$ to $310_n$ may be equivalent to one virtual pixel point, and the n virtual image pixels together form a desired image, which is an image that is desired to be actually seen by the viewer, for example, a picture in a video sequence etc., and is equivalent to a virtual image formed by an image displayed by a virtual object pixel on one side of the display unit away from the viewer.

Further, it can be understood by those skilled in the art that a virtual image of a desired image may be obtained at a virtual image position by controlling the display unit to display an actual image corresponding to the desired image and imaging the actual image using a lens unit. It should be illustrated that since one virtual image pixel of a desired image is obtained by mixing light emitted from at least two pixel units in an actual image displayed on a display unit, a resolution of the desired image is lower than that of the actual image.

In addition, it can be understood by those skilled in the art that although the above example is described by taking two adjacent pixel units as an example, according to an embodiment of the present disclosure, micro-lenses may also be disposed such that light emitted from three or more adjacent pixel units is mixed to form a single virtual image pixel having a desired grayscale.

Figure 3B:
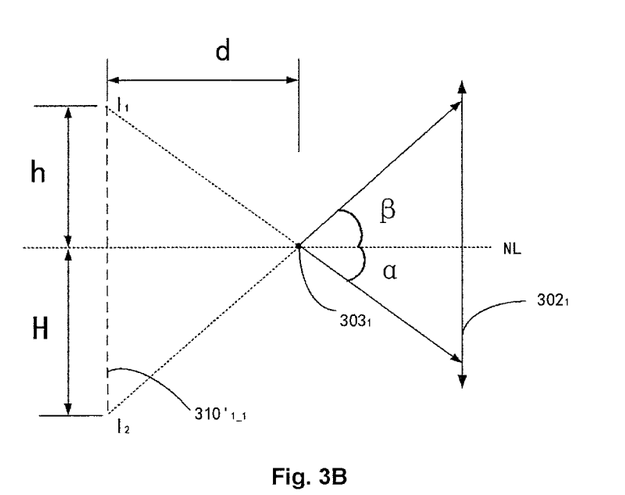
FIG. 3B illustrates a schematic diagram of a relationship between pixel units and a corresponding virtual object pixel according to an embodiment of the present disclosure.

Next, a schematic diagram of a relationship between pixel units and a corresponding virtual object pixel according to an embodiment of the present disclosure will be described with reference to FIG. 3B. For the convenience of description, the pixel unit $303_1$ is taken as an example in FIG. 3B, and it can be understood by those skilled in the art that the following description is applicable to each pixel unit. As shown in FIG. 3B, each pixel unit corresponds to one virtual object pixel and one virtual image pixel. For the pixel unit $303_1$, a micro-lens $302_1$ is configured such that:

$$\tan \alpha = \frac{h}{d} \text{ and } \tan \beta = \frac{H}{d},$$

where α is an angle between a line connecting a first vertex $I_1$ of a first virtual object pixel $310'_{1\_1}$ to the pixel unit $303_1$ and a normal NL of the display unit, β is an angle between a line connecting a second vertex $I_2$ of the first virtual object pixel $310'_{1\_1}$ to the pixel unit $303_1$ and the normal NL; h is a distance from the first vertex $I_1$ to the normal NL, H is a distance from the second vertex $I_2$ to the normal NL, and d is a distance from the pixel unit $303_1$ to the first virtual object pixel $310'_{1\_1}$ along a direction of the normal NL.

It should be illustrated that, according to an embodiment of the present disclosure, in an example in which light emitted from the pixel unit $303_1$ and light emitted from the pixel unit $303_2$ form one virtual image pixel $310_1$, the first virtual object pixel $310'_{1\_1}$ may be a corresponding virtual object pixel $310'_1$ of the virtual image pixel $310_1$, or may also be a part of the virtual object pixel $310'_1$.

H, h, and d may be preset according to practical requirements, and values of α and β are calculated using the above formula. In one example, H may be preset to be in a range of −10 μm to 20 μm, h may be preset to be in a range of −10 μm to 20 μm, and d may be preset to be in a range of 1 mm to 100 mm. In an embodiment according to the present disclosure, an absolute value of α is less than or equal to 70°, and an absolute value of β is less than or equal to 70°.

Figure 4:
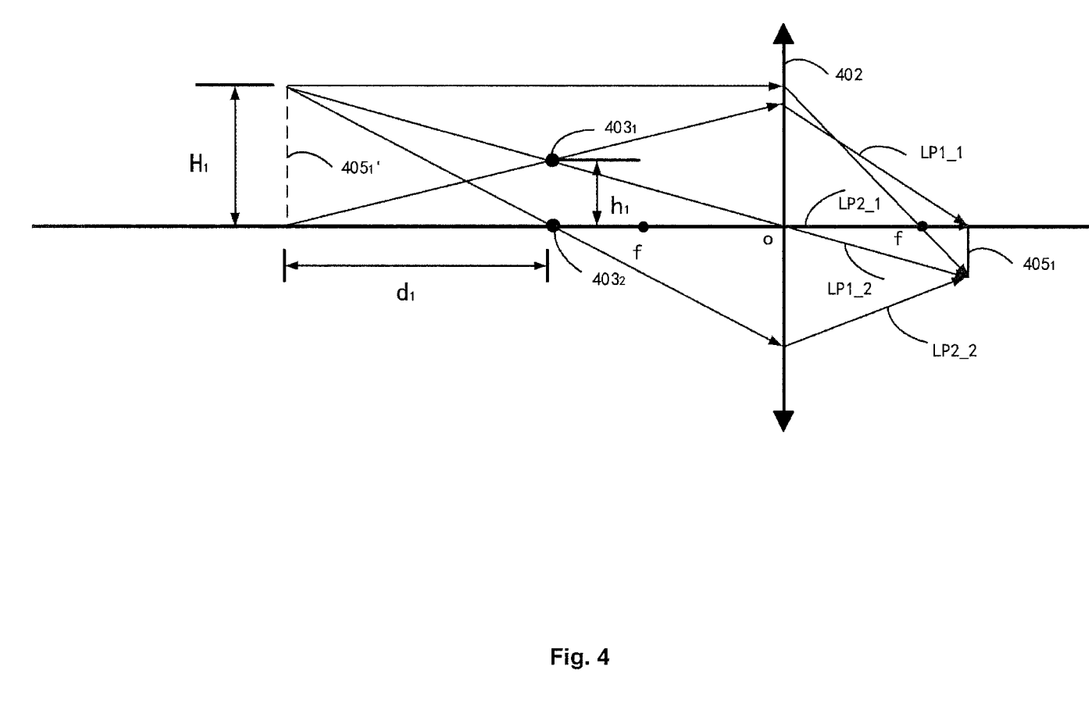
FIG. 4 illustrates an exemplary schematic diagram of a light path according to another embodiment of the present disclosure.

FIG. 4 illustrates an exemplary schematic diagram of a light path according to another embodiment of the present disclosure. In FIG. 4, o is an optical center of an equivalent lens unit 402, and f is a focus of the lens unit 402. As shown in FIG. 4, unlike the embodiment shown in FIG. 2B, a pixel unit $403_1$ and a pixel unit $403_2$ are disposed away from the lens unit 402 by more than one focal length. Light emitted from the pixel unit $403_1$ is refracted through the equivalent lens unit 402 and emitted as light LP1_1 and LP1_2, and light emitted from the pixel unit $403_2$ is refracted through the lens unit 402 and emitted as light LP2_1 and LP2_2. A light beam between the light LP1_1 and LP1_2 and a light beam between the light LP2_1 and LP2_2 are mixed to form a real image pixel $405_1$ at a position away from the lens unit 402 by more than one focal length on one side of the lens unit 402 close to a viewer. This real image pixel $405_1$ may be equivalent to an inverted real image formed by light emitted from a virtual object pixel $405_1'$ on one side of the lens unit 402 away from the viewer.

In the embodiment of FIG. 4, each real image pixel $405_1$ may be equivalent to one real pixel point, and these real image pixels together form a desired image, which is an image that is desired to be actually seen by the viewer. For example, it may be an information prompt which is provided when human eyes see an actual scene in virtual reality display, and the information prompt may only occupy a small part of an entire scene range which is seen by the human eyes. In the embodiment of FIG. 4, a distance from the virtual object pixel $405_1'$ to the pixel unit is $d_1$, which is in a range of 10 cm to 30 cm, $H_1$ is in a range of −10 μm to 20 μm, $h_1$ is in a range of −10 μm to 20 μm, a focal length f is in a range of 2 cm to 8 cm, and a distance from the formed real image pixel $405_1$ to the lens unit 402 is in a range of 2 cm to 15 cm.

Figure 5:
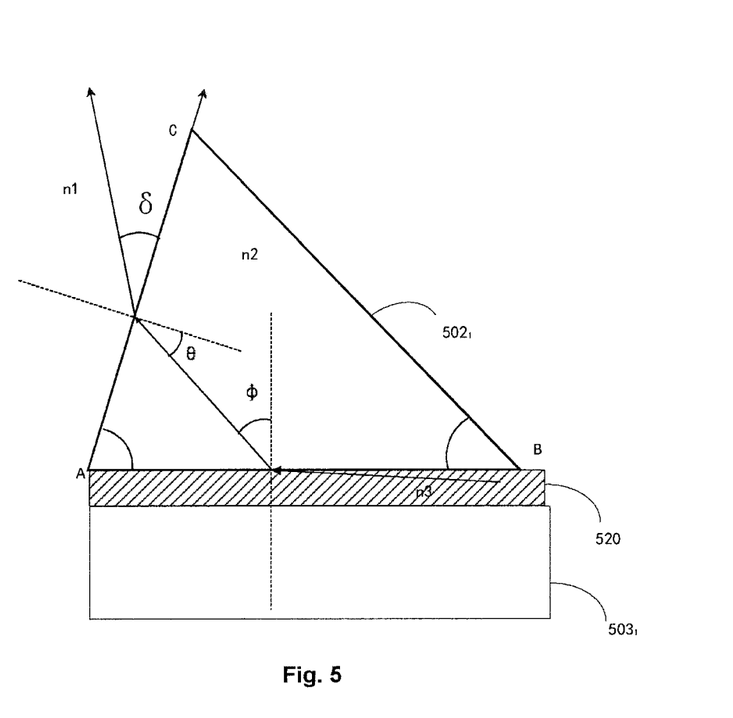
FIG. 5 illustrates an exemplary schematic diagram of a light path according to yet another embodiment of the present disclosure.

FIG. 5 illustrates a schematic diagram of a light path in a specific implementation example according to yet another embodiment of the present disclosure. In the example of FIG. 5, a triangular prism for changing a light exiting direction may be disposed on a light exiting surface of a display screen, such that a light exiting light path changes, and the triangular prism cooperates with a lens unit to form a corresponding virtual object and a corresponding virtual image. As shown in FIG. 5, a transparent material layer 520 may be coated between a pixel unit $503_1$ and a triangular prism $502_1$, and a refractive index of the transparent material layer 520 may satisfy the following conditions:

$$0 \leq \arcsin \frac{n_1}{n_2} \leq 70° \text{ and } 0 \leq \arcsin \frac{n_3}{n_2} \leq 70°,$$

where $n_1$, $n_2$ and $n_3$ are a refractive index of light emitted from the pixel unit $503_1$ with respect to air, a refractive index of the light emitted from the pixel unit $503_1$ with respect to the triangular prism $502_1$, and a refractive index of the light emitted from the pixel unit $503_1$ with respect to the transparent material layer 520 respectively. A base angle A of the triangular prism may satisfy A=(θ+ϕ)−δ, wherein a magnitude of δ may determine a magnitude and a direction of an angle of emergence from the triangular prism. A magnitude of a base angle B may satisfy B=90°−ϕ. In one example, $n_1$ may be in a range of 1.0 to 1.8, $n_2$ may be in a range of 1.0 to 1.8, and $n_3$ may be in a range of 1.0 to 1.8. Θ may be in a range of 0° to 70°, and φ may be in a range of 0° to 70°.

By disposing the transparent material layer 520, a divergence angle of light from the pixel unit 503$_1$ in various directions after entering the triangular prism is concentrated in a range of 0° to φ, that is, an angle between a direction in which the light enters the triangular prism and a normal is less than φ. At this time, a light beam which enters the triangular prism from a base side AB of the triangular prism may be emitted from an AC side of the triangular prism, and an angle between a direction of emergence from the AC side and the AC side is less than δ. A BC side of the triangular prism may be coated with an absorbing film material, such that light reflected from or directed to a BC surface is absorbed. Therefore, a light exiting range of light emitted from each pixel unit 503$_1$ after being refracted through the triangular prism may be set according to the refractive indexes $n_1$, $n_2$ and $n_3$, such that the light emitted from the pixel unit 503$_1$ and light emitted from an adjacent pixel unit may be refracted through the triangular prism to form one virtual image pixel having a single desired grayscale. The triangular prism is taken as an example in the embodiment of the present disclosure, and prisms having other shapes may also be selected.

The triangular prism 502$_1$ and the transparent material layer 520 together constitute a light path adjustment unit capable of adjusting a light path of the light emitted from the pixel unit 503$_1$. such that the adjusted light path has a predetermined range of incident angles with respect to the lens unit. The light path adjustment unit cooperates with the lens unit to form a corresponding virtual object and a corresponding virtual image.

According to an embodiment of the present disclosure, the micro-lens may be a prism, a convex lens, or a cylindrical lens. A focal length of the micro-lens may be calculated according to a required magnification factor, a distance from human eyes to the micro-lens, and a distance from a virtual image pixel to the human eyes. A radius of curvature of a curved surface of each micro-lens etc. may be calculated according to a type of the micro-lens (for example, a prism, a convex lens, or a cylindrical lens), a focal length of the micro-lens, and a refractive index of a material of the micro-lens etc., so as to configure the lens according to practical requirements.

According to an embodiment of the present disclosure, the display unit may be a liquid crystal display unit or an organic light emitting diode display unit etc.

According to an embodiment of the present disclosure, the display apparatus according to the embodiment of the present disclosure controls a direction of light emitted from each pixel unit using a lens unit and/or a light path adjustment unit, such that it is equivalent to imaging a virtual object on one side of the display unit away from a viewer (i.e., one side opposite to the lens unit) as a virtual image having a desired image through a micro-lens, wherein the virtual object has the same desired image, which can reduce an actual distance from the display unit to the viewer's human eyes, thereby making the display apparatus more portable.

Although the present disclosure has been particularly shown and described with reference to the typical embodiments of the present disclosure, it will be understood by those of ordinary skill in the art that these embodiments may be changed variously in form and detail without departing from the spirit and scope of the present disclosure defined by the appended claims.

We claim:

1. A display apparatus, comprising:
a display unit having a plurality of pixel units;
a lens unit; and
a light path adjustment unit disposed between the display unit and the lens unit and configured to adjust a light path of light emitted from at least one of the plurality of pixel units, such that the adjusted light path has a predetermined range of incident angles with respect to the lens unit,
wherein each of the pixel units corresponds to one virtual object pixel and one virtual image pixel,
wherein a first micro-lens corresponding to a first pixel unit is configured such that:

$$\tan \alpha = \frac{h}{d} \text{ and } \tan \beta = \frac{H}{d},$$

where α is an angle between a line connecting a first vertex of a first virtual object pixel corresponding to the first pixel unit to the first pixel unit and a normal of the display unit, β is an angle between a line connecting a second vertex of the first virtual object pixel to the first pixel unit and the normal: h is a distance from the first vertex to the normal, H is a distance from the second vertex to the normal, and d is a distance from the first pixel unit to the first, virtual object pixel along a direction of the normal.

2. The display apparatus according to claim 1, wherein the light path adjustment unit comprises:
a transparent material layer disposed between the display unit and the lens unit; and
a prism disposed between the transparent material layer and the lens unit and having a refractive index greater than that of the transparent material layer.

3. The display apparatus according to claim 2, wherein the refractive index of the transparent material layer satisfies the following conditions:

$$0 \le \arcsin\frac{n_1}{n_2} \le 70° \text{ and } 0 \le \arcsin\frac{n_3}{n_2} \le 70°,$$

where $n_1$, $n_2$ and $n_3$ are the refractive index of the light emitted from the pixel unit with respect to air, the refractive index of the light emitted from the pixel unit with respect to the prism, and a refractive index of the light emitted from the pixel unit with respect to the transparent material layer, respectively.

4. The display apparatus according to claim 2, wherein the prism is a triangular prism.

5. The display apparatus according to claim 1, wherein the lens unit comprises a plurality of micro-lenses corresponding to the plurality of pixel units in an one-to-one manner.

6. The display apparatus according to claim 5, wherein the display unit is divided into a plurality of display regions, wherein each of the display regions comprises at least two adjacent pixel units, and light emitted from each of the display regions forms a virtual image pixel through a corresponding one of the micro-lenses.

7. The display apparatus according to claim 6, wherein the virtual image pixel has a desired single grayscale.

8. The display apparatus according to claim 6, wherein two adjacent display regions comprise at least one common pixel unit.

9. The display apparatus according to claim 5, wherein the micro-lens is a prism, a convex lens, or a cylindrical lens.

10. The display apparatus according to claim 1, wherein the display unit is a liquid crystal display unit or an organic light emitting diode display unit.

11. The display apparatus according to claim 1, wherein H is in a range of 10 μm to 20 μm, h is in a range of −10 μm to 20 μm, and d is in a range of 1 mm to 100 mm.

12. The display apparatus according to claim 1, wherein the absolute value of $\alpha$ is less than or equal to 70°, and the absolute value of $\beta$ is less than or equal to 70°.

* * * * *